Patented Sept. 7, 1926.

1,598,672

UNITED STATES PATENT OFFICE.

ANSON G. BETTS, OF KINDERHOOK, NEW YORK.

CHEMICAL PROCESS.

No Drawing.   Application filed January 9, 1922.   Serial No. 528,096.

This invention, broadly, makes use of low-grade or impure fluorspars and minerals containing calcium fluoride, lime, basic sulphates or materials capable of producing sulphuric acid or sulphates by oxidation, common salt and other alkali-metal salts and common aluminous and ferruginous materials, for the production of hydrofluoric acid, fluorides, alumina, aluminum salts and alums, common acids, caustic and carbonated alkalies, iron and related pigments and calcium sulphate.

The object of my invention is to produce these aforementioned products of standard and high quality at less cost than at present and in some cases to utilize materials impracticable or impossible to utilize by present methods.

The process depends on the formation and treatment of certain compounds containing fluorine and aluminum, or metal of the aluminum group when practicable. The source of the fluorine used in carrying out my invention is in part at least natural calcium fluoride, of which I may use to advantage cheap and low-grade qualities, the fluorine thereof being converted primarily into a soluble (in water) compound of a trivalent metal, aluminum, iron or chromium, or a mixture of two or more of them, while the calcium thereof is converted into a calcium salt, generally the sulphate, either primarily or secondarily.

It is usual to decompose fluorspar by distillation with sulphuric acid, yielding hydrofluoric acid and calcium sulphate, but there is a serious difficulty from the presence of silica or silicates in the natural fluorspar, which reacts with the hydrofluoric acid as generated and seriously increases the cost and lowers the grade of the hydrofluoric acid unless a relatively expensive and pure fluorspar is used, and even this contains some of the objectionable silica, so that the process is expensive, the yield reduced and the acid produced not free from fluosilicic acid, as is well-known. In practicing my invention I am able to produce purer and cheaper hydrofluoric acid from lower grade material, in fact may readily obtain hydrofluoric acid free from silica, and this cheaper and better hydrofluoric acid is applied to advantage for the production of a number of heavy chemicals, including alums and aluminum salts, and acids and alkalies, while the intermediate materials needed for the preparation of said purer and cheaper hydrofluoric acid are themselves present in the process or by-products thereof, in sufficient quantities, or more.

Beginning the description of the process with the first operation performed on the crude calcium fluoride or fluorspar, I first get the fluorine thereof into solution as a compound of aluminum, iron or chromium, and get entirely rid of the silica of the crude calcium fluoride as an insoluble residue or material. This soluble compound may be either an iron, aluminum, etc., double fluoride-sulphate, fluoride-chloride, fluoride-nitrate, etc., or the soluble iron, aluminum, etc. simple fluoride. I may accomplish this result by distilling the crude calcium fluoride with strong sulphuric acid in the well-known way, yielding an aqueous acid containing both hydrofluoric and fluosilicic acid, which is neutralized with alumina or ferric oxide, or suitable material containing either or both, when the fluosilicic acid and hydrofluoric acid are both converted to the fluoride or fluorides in question, typical reactions being written

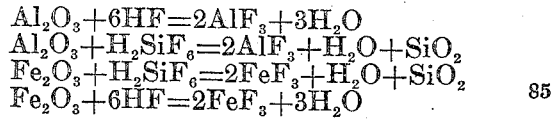

The silicon may be separated by filtration.

A pure solution or ferric fluoride or aluminum fluoride may be concentrated by evaporation and distilled with sulphuric acid yielding pure HF distilled and a residue of dry ferric or aluminum sulphate, all of value, but my preferred treatment of ferric fluoride solution is to reduce the same to the ferrous state by suitable reagents, as metallic iron, hydrogen sulphide or electrolytic cathode action, when relatively insoluble ferrous fluoride may be readily separated from the solution, the reactions being written

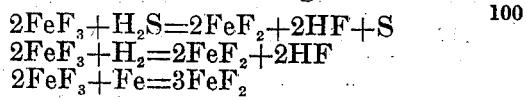

The ferrous fluoride may also be distilled with sulphuric acid for HF and ferrous sulphate but can also be advantageously utilized in connection with aluminum fluoride solution, by precipitating a solution containing alkaline metal salt and aluminum salt, yielding a precipitate of alkaline metal fluoaluminate containing the fluorine of the ferrous fluoride and ferrous sulphate or mother iron salt containing the iron thereof, for example:

1. $2AlF_3 + 3FeF_2 + Na_2SO_4 = 2Na_3AlF_6 + 3FeSO_4$
2. $2AlF_3 + 3FeF_2 + 6NaCl = 2Na_3AlF_6 + 3FeCl_2$
3. $2FeF_2 + 2HF + 2AlF_3 + 6NaCl = 2Na_3AlF_6 + 2FeCl_2 + 2HCl$

From the mother liquor from equation 3, $$2FeCl_2 + 2HCl + O = 2FeCl_3 + H_2O$$

The aluminum fluoride solution obtained as above described I treat in solution with an alkali-metal salt, as $NaCl$, $NaHSO_4$, $Na_2SO_4$, $NaNO_3$, $KCl$, $K_2SO_4$, $Na_2S$, and hydrofluoric acid free from or low in silica preferably, according to the following typical equations, precipitating an alkali-metal fluoaluminate, though not limited to the type of formula of the equations:

$AlF_3 + 3NaCl + 3HF = Na_3AlF_6 + 3HCl$
$AlF_3 + 3NaNO_3 + 3HF = Na_3AlF_6 + 3HNO_3$
$AlF_3 + 3KCl + 3HF = K_3AlF_6 + 3HCl$
$2AlF_3 + 3K_2SO_4 + 6HF = 2K_3AlF_6 + 3H_2SO_4$
$2AlF_3 + Na_2S + 6HF = 2Na_3AlF_6 + 3H_2S$

Returning to the preparation of iron and aluminum fluorides in solution by the action of hydrofluoric or fluosilicic acids or both on the respective oxides, hydrates, silicates etc., if a mixed iron and aluminum fluoride solution is obtained, by reduction of the ferric fluoride to the ferrous state and the addition of an alkali metal salt, the fluorine and aluminum present may be recovered as alkali-metal fluoaluminate, while the iron remains in solution, the equation probably should be written as follows—

$$2H + 2AlF_3 + 2FeF_3 + 6NaCl = 2Na_3AlF_6 + 2FeCl_2 + 2HCl$$

If the solution consists mainly of aluminum fluoride and a minor quantity of ferric fluoride, the latter should be reduced to the ferrous state before proceeding with the recovery of alkali-metal fluoaluminate as in this way the fluorine in combination with the ferric iron may be recovered as well, and the iron kept out of the product to a large or complete degree.

In practicing my invention, as will be shown hereinafter, relatively pure or very pure calcium fluoride (having especial regard to silica) may be recovered, which can be used in the preparation of hydrofluoric acid better than low-grade natural calcium fluoride, and while there is, ideally, no loss of calcium fluoride in the cyclic operation of the process, nevertheless there are always losses to be made up in the operation of any process, and also since some or all of the fluorine-containing intermediate products of the process have technical value and markets exist therefor, such or any of them may be withdrawn, deficiencies in the amount of fluorine require to be made up.

Instead of primarily decomposing the introduced or new supply of natural calcium fluoride by distillation with sulphuric acid as above mentioned, I may make use of the relatively pure calcium fluoride of the process for the direct production of hydrofluoric acid required, by distillation with sulphuric acid, and effect the extraction of fluorine from the new calcium fluoride in the wet way described below, the economy thereof being relatively the more important, the lower the grade the calcium fluoride used, with the incidental separation of the silica and elimination thereof in the undissolved residues.

It has been previously known that calcium fluoride could be decomposed by treatment with a solution of aluminum sulphate, producing a solution of aluminum fluoride-sulphate and a residue of calcium sulphate, the following reaction having been assigned as showing the actual occurrence.

$$2CaF_2 + Al_2(SO_4)_3 = Al_2F_4SO_4 + 2CaSO_4$$

The above may be the limiting reaction for long prolonged action, but for technical purposes, the reaction may not proceed quite as far, that is, unaltered aluminum sulphate may be also present in the solution, which however does not alter the general nature of the processes or results, but will to some degree affect the actual proportions of reacting compounds required to obtain the results herein described.

Technically, the calcium fluoride should be very finely ground, the aluminum sulphate solution should be maintained hot, and the mixture well agitated, during the progress of the reactions.

I have discovered that I may also decompose fluorspar or calcium fluoride with certain other solutions, as ferric sulphate, nitrate and chloride, and aluminum chloride, nitrate, and contemplate the similar use of trivalent chromium salts as well.

The reaction with ferric sulphate is similar to that with aluminum sulphate, and it is preferred to have no ferrous salt present. With aluminum chloride, etc., calcium chloride, etc., is formed instead of calcium sulphate and goes into solution, and the calcium may be subsequently conveniently removed as calcium sulphate by adding sulphuric acid or a sulphate. Advantage may be taken of the use of aluminum chloride, etc., when the calcium fluoride used contains other valuable material, which it is not desired to have contaminated with calcium sulphate, for example, a mixture of barium sulphate and calcium fluoride occurring naturally may be utilized, leaving a purified residue of barium sulphate.

Whether it is best in any particular instance to use the sulphates, chloride, nitrates, etc., depends on the by-products desired, and other considerations that will occur to one skilled in the art.

Whether the aluminum, iron, etc. salt used, is added directly to the reaction-vessel, or ingredients which combine therein to make the same, such as for instance, ferric oxide and hydrochloric acid instead of ferric chloride, may be decided according to circumstances, the invention comprising carrying out this step in either way.

By the foregoing method I obtain a solution of a double salt of aluminum or iron, or both, part fluoride, and part some other salt, as pointed out.

Having regard to the fact that a solution of aluminum sulphate containing some iron sulphate is in general a very cheap article producible from a variety of aluminous materials by very cheap chemical methods, and that opportunity is afforded by the process to effect a separation of the iron and aluminum contents, and thereby increase the value of the contained aluminum very considerably, the use of such a solution in my process is relatively important.

If the quantity of the ferric salt relatively to the aluminum salt is small, it is preferable to remove the iron therefrom, before utilizing the solution further. The iron may be largely or entirely removed by reduction partly to the ferrous state in absence of free acid, a dense muddy precipitate forming, and being easily removed by decantation. On gently calcining this precipitate it is converted into a light-red iron pigment of good color. Any other suitable methods may be used for removing the iron.

If the iron is present in relatively large quantity, the removal thereof from the solution by precipitation methods would be uneconomical in general, and a better method of procedure in this case is believed to be to reduce the ferric iron to ferrous iron best in presence of some free acid, so that the solution contains ferrous fluoride instead of ferric fluoride or fluoride-double salt. The fluorine is firmly united to iron in the ferric state, but loosely united to ferrous iron, and the fluorine is as readily reactable as if added as hydrofluoric acid, or a simple fluoride as sodium fluoride.

By the foregoing method, the solution obtained in reacting on calcium fluoride with mixed iron and aluminum sulphate, may have the iron eliminated by chemical precipitation methods if present in small quantity, or if in large quantity, by reduction the fluorine combined with the iron is converted into reactable form.

A desirable method of procedure with solution largely of aluminum salt, after removing iron, is to evaporate the solution to a thick syrup, and add the right amount of concentrated sulphuric acid, and distil at a high temperature, yielding hydrofluoric acid free or practically free from silica and a residue of practically anhydrous aluminum sulphate, a technically valuable article. The fluoride-sulphate of aluminum is extremely soluble in water, may be evaporated to a thick syrup, and then practically to dryness and readily redissolves in water.

Using solutions containing considerable iron, after reducing the iron to the ferrous state, an alkali-metal salt and hydrofluoric acid are added, unless the amount of ferrous fluoride present is alone sufficient to yield alkali-metal fluoaluminate with all the aluminum present, which precipitates alkali-metal fluoaluminate, iron remaining in solution, though not limited to a fluoaluminate of the particular type or formula represented.

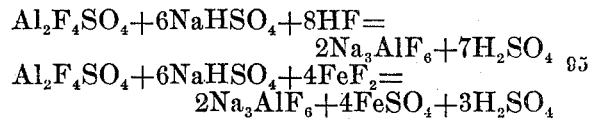

The above equations are given as an example, but I am not limited thereto.

Particular objects may be obtained by the use of particular solutions for reacting on calcium fluoride, of which I may mention the use of iron chloride. By reacting on calcium fluoride with ferric chloride, the calcium fluoride goes into solution as calcium chloride and ferric fluoride-chloride. On reducing the solution, which may be done for example electrolytically, the calcium and fluorine are reprecipitated as calcium fluoride, and the solution consists of ferrous chloride and HCl. By reoxidation, which may also be done electrolytically, ferric chloride is reformed, and may be used over again in the same way.

If calcium fluoride is decomposed with ferric sulphate solution, giving calcium sulphate and ferric fluoride-sulphate solution, this may be decomposed analogously to the decomposition of aluminum sulphate-fluoride already described, into pure hydrofluoric acid, and anhydrous ferric sulphate, a technically valuable article, or this can be further heated for the production of iron oxide pigment and sulphuric acid.

Having explained the derivation of aluminum fluoride solution and aluminum fluoride-double salts in solution, and the ready possibility of producing hydrofluoric acid free from, or low in, silica, combination is effected, in water solution, between aluminum, alkali-metal and fluorine as alkali-metal fluoaluminate by such reactions as the following examples.

$AlCl_3 + 3NaCl + 6HF = Na_3AlF_6 + 6HCl$
$Al_2(SO_4)_3 + 3Na_2SO_4 + 12HF =$
$\quad 2Na_3AlF_6 + 6H_2SO_4$
$Al(NO_3)_3 + 3NaNO_3 + 6HF =$
$\quad Na_3AlF_6 + 6HNO_3$
$AlCl_3 \cdot AlF_3 + 6NaCl + 9HF =$
$\quad 2Na_3AlF_6 + 9HCl$
$AlFCl_2 + 3NaCl + 5HF = Na_3AlF_6 + 5HCl$
$AlF(NO_3)_2 + 3NaNO_3 + 5HF =$
$\quad Na_3AlF_6 + 5HNO_3$
$AlF_2Cl + 3NaCl + 4HF = Na_3AlF_6 + 4HCl$
$AlF_2NO_3 + 3NaNO_3 + 4HF =$
$\quad Na_3AlF_6 + 4HNO_3$
$Al_2F_4SO_4 + 3K_2SO_4 + 8HF =$
$\quad 2K_3AlF_6 + 4H_2SO_4$ Through the agency of lime, the alkali-metal fluoaluminates may be made to yield calcium fluoride, and alkali hydroxides, aluminates, carbonates etc., as pointed out more particularly in my application for patent filed herewith Serial Number 528,095 the calcium fluoride produced being returnable to the process to any extent desired.

It is well-known that sodium fluoaluminate, may be decomposed with lime in either the wet or dry way, producing a sodium aluminate and calcium fluoride, the reaction being written $$Na_3AlF_6 + 3CaO = Na_3AlO_3 + 3CaF_2$$

By the action of $CO_2$ sodium aluminate in solution, yields precipitated alumina and sodium carbonate, as is well-known, thus, $2AlNa_3O_3 + 3CO_2 + 3H_2O =$
$\quad 2Al(OH)_3 + 3Na_2CO_3$ In Richards' "Aluminum" 1896, published by Henry Carey Baird & Co., Philadelphia, it is stated on pages 150 and 151, that the sodium aluminate and sodium fluoaluminate, in the proportions given in the following equation, yield aluminum hydroxide and solution of sodium fluoride, thus, $Na_3AlF_6 + 2Na_3AlO_3 + 6H_2O =$
$\quad 4Al(OH)_3 + 12NaF$ And it is also stated that the sodium fluoride may be converted into caustic soda by lime, as follows $$2NaF + Ca(OH)_2 = 2NaOH + CaF_2$$

The net result of the above is to convert sodium fluoaluminate and lime, into aluminum hydroxide, caustic soda and calcium fluoride.

I prefer however to decompose the solution containing sodium aluminate with lime or equivalent base, precipitating calcium aluminate and leaving caustic soda in solution, and using the calcium aluminate in decomposing sodium fluoaluminate, instead of lime alone. The sodium aluminate solution produced in this way, will contain a higher proportion of alumina to soda than given in the formula $Na_3AlO_3$ and may be considered to contain largely the aluminate $NaAlO_2$.

Such a solution relatively high in alumina as compared to soda, may be made to deposit alumina by digestion alone, and I prefer to perform this digestion, separate the alumina, from the high-soda aluminate remaining in solution, precipitate the balance of the alumina with lime as calcium aluminate, separate the caustic soda, and use the calcium aluminate in decomposing sodium fluoaluminate instead of lime.

As to raw aluminous materials, there is a large variety of materials which may be utilized especially in the preparation of crude aluminum sulphate containing iron sulphates, such as pyritic shales, schists, lignites, clays, bauxites, alunites, besides wastes from copper leaching plants and others. A description of many of the processes applied are given in "The Manufacture of Alum and the Sulphates and Other Salts of Alumina and Iron" by Lucien Geschwind, 1901, D. Van Nostrand & Co., New York.

My process has advantages in the treatment of, and recovery of alumina or alumina salts, etc., from material containing also potash as well as alumina, as feldspars and feldspathic and micaceous rocks, and alunites, which may be obtained relatively low in iron. It is well known that some fluorine compounds have decomposing properties which effect the decomposition of silicate rock materials, acted on by ordinary reagents or acids, very little or not at all. But the use of hydrofluoric acid and fluorides in acid solutions for this purpose, on feldspars etc., is objectionable or difficult for two reasons: one being the loss of the reagent through action on silica, and the other the insoluble nature of the double fluorides or fluoaluminates of the potash, which interfere with the reactions and are difficult to recover.

These difficulties may be largely or entirely obviated by arranging to take the aluminum of such silicate materials into solution as the fluoride double salt as the fluoride-sulphate, making use of the following reactions—

$CaF_2 + H_2SO_4 = CaSO_4 + 2HF$
$Al_2O_3 + 4HF + H_2SO_4 = Al_2F_4SO_4 + 3H_2O$
$CaO + H_2SO_4 = CaSO_4 + H_2O$
$K_2O + H_2SO_4 = K_2SO_4 + H_2O$
$Na_2O + H_2SO_4 = Na_2SO_4 + H_2O$

By the interaction of the aluminous material and sulphuric or other suitable acid under a preferably gradual introduction of a supply of hydrofluoric acid or equivalently acting fluoride as $AlF_3$, $NaF$ etc., supplied as such, or as a reaction mixture producing them, I am enabled to take both the aluminum and potash and soda or other alkali metal into a stable solution with greater ease and certainty than hitherto, or from materials that will not yield to sulphuric acid solution alone, eliminating lime as calcium salt (insoluble if the sulphate), and leaving the silica undissolved as worthless residue.

The solution may be purified from iron, or the iron all reduced to the ferrous state, as is most suitable in each case, and the solution further utilized in several ways of which I will give examples.

1. Add sufficient potash salt or aluminum salt as the case may be, to yield potash alum, evaporate and distil with sulphuric acid, for hydrofluoric acid and a residue of anhydrous potash alum.

2. Add HF or a suitable fluoride, and precipitate and recover potassium fluoaluminate.

3. Evaporate to high concentration, separate $K_2SO_4$, and utilize the mother liquor by distillation with $H_2SO_4$ for HF and aluminum sulphate.

The utilization of potassium fluoaluminate may be effected along the lines shown for sodium fluoaluminate.

The calcium fluoride eliminated from the process in various ways, but especially as derived from the decomposition of alkali-metal fluoaluminates with lime may be returned to the process in ways which have been pointed out. Theoretically there need be no consumption of calcium fluoride in operating my process, but practically there is loss in all processes, and as the calcium fluoride and other fluorine compounds are more valuable than the crude materials, I contemplate the outside disposition of large proportions of the fluorine taken in, and the use of the practicable maximum amount of new crude low-grade calcium fluoride.

To point out the ideal or "theoretical" proportions based on the foregoing equations and formulas to which I am not limited, and leaving out the intermediate steps, the following chemical equations may be given, of materials consumed and obtained.

$$Al_2O_3 + 5H_2SO_4 + 2CaF_2 = 4HF + 2CaSO_4 + Al_2(SO_4)_3$$

The foregoing equation shows the stoichiometrical proportions in the conversion of alumina (in clay, bauxite, etc.), fluorspar or calcium fluoride, and sulphuric acid, into hydrofluoric acid and aluminum sulphate, and of calcium fluoride into calcium sulphate.

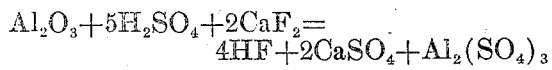

$$3Al_2O_3 + 6CaF_2 + 13H_2SO_4 + 6NaHSO_4 + 6CaO = 2Al_2(SO_4)_3 + 6CaF_2 + Al_2O_3 + 6NaOH + 6CaSO_4 + 7H_2SO_4 + 6H_2O$$

The foregoing equation shows the proportions when (a) aluminum sulphate is produced from alumina (in clay etc.) and sulphuric acid, (b) aluminum sulphate reacts with calcium fluoride, (c) two-thirds of the aluminum fluoride-sulphate produced is evaporated and distilled with sulphuric acid for hydrofluoric acid and aluminum sulphate (purified), (d) the HF produced and the remaining aluminum fluoride-sulphate and sodium acid sulphate (nitre cake) react together to produce sodium fluoaluminate and sulphuric acid, and (e) the sodium fluoaluminate is converted to caustic soda and alumina with the production of calcium fluoride, by the action of lime.

$$Al_2O_3 + 6CaF_2 + 7H_2SO_4 + 6CaO + 6NaHSO_4 = Al_2O_3 + 6CaF_2 + 6CaSO_4 + 6NaOH + 7H_2SO_4.$$

or, simplified, $$Al_2O_3(\text{crude}) + 6CaO + 6NaHSO_4 = Al_2O_3(\text{pure}) + 6CaSO_4 + 6NaOH$$

The foregoing applies to (a) alumina and sulphuric acid to alumina sulphate (b) alumina sulphate and fluorspar to aluminum fluoride-sulphate and calcium sulphate, (c) calcium fluoride from the process plus sulphuric acid to hydrofluoric acid and calcium sulphate, (d) aluminum fluoride-sulphate, nitre-cake, and hydrofluoric acid to sodium fluoaluminate and sulphuric acid, and (e) lime and sodium fluoaluminate to calcium fluoride, caustic soda and alumina hydroxide.

$$Al_2O_3 + 6HCl + 6CaF_2 + 6H_2SO_4 + 6CaO + 6NaCl = Al_2O_3 + 6NAOH + 6CaSO_4 + 6CaF_2 + 12HCl.$$

The foregoing equation applies to (a) conversion of $Al_2O_3$ (crude) to $AlCl_3$ by HCl, (b) reaction of $AlCl_3$ on $CaF_2$, producing aluminum fluoride-chloride and calcium chloride, (c) precipitation of $CaSO_4$ from the solution by adding sulphuric acid, (d) distilling $CaF_2$ with sulphuric acid for hydrofluoric acid and calcium sulphate, (e) interaction of solution containing hydrochloric acid, aluminum fluoride-chloride and sodium chloride in solution with hydrofluoric acid producing sodium fluoaluminate and solution of hydrofluoric acid, and (f) conversion of sodium aluminate to alumina, soda, and of lime to calcium fluoride by action of lime on sodium fluoaluminate.

The sodium (Na) in these reactions may be replaced by potassium (K) and nitrates by chlorides, chlorates, perchlorates, and other practicable alkali-metal salts.

In the treatment of a feldspar consisting of essentially $CaO$, $Al_2O_3$, $K_2O$, $Na_2O$, and $SiO_2$, the reactions could be written $$CaO+H_2SO_4=CaSO_4+H_2O$$
$$3Al_2O_3 + 6CaF_2 + 7H_2SO_4 + 3K_2SO_4 + 6CaO = Al_2O_3 + 6CaF_2 + 6CaSO_4 + 6HOH+4H_2SO_4$$
$$K_2O+H_2SO_4=K_2SO_4+H_2O$$
$$Na_2O+H_2SO_4=Na_2SO_4+H_2O$$
$$SiO_2=SiO_2$$

Or the reactions could be written, $$CaO+H_2SO_4=CaSO_4+H_2O$$
$$Al_2O_3+5H_2SO_4+2CaF_2= 4HF+2CaSO_4+Al_2(SO_4)_3$$
$$K_2O+H_2SO_4=K_2SO_4+H_2O$$
$$Na_2O+H_2SO_4=Na_2SO_4+H_2O$$
$$SiO_2=SiO_2.$$

According to whether it was desired to recover the alumina as the sulphate, or to recover alumina as purified oxide with the simultaneous recovery of an alkali, in the manner herein explained.

My process has more limited application in the preparation of solutions of such acids as chloric acid, perchlorid acid, dithionic acid, difficultly-crystallizable organic sulphonic acids from the solutions of the alkali-metal salts of such acids, the alkali-metal being removed as alkali-metal fluoaluminate, leaving the free acid in solution.

In the claims the reducible metal, refers to the metal in the shape of a soluble salt reducible to what is called in text-books, a lower stage of oxidation, in solution.

Reference may be had to my copending application Serial Number 528,098 disclosing but not claiming common subject matter.

What I claim as new and desire to secure by Letters Patent, is—

1. Process of decomposing calcium fluoride with a solution of a salt of a polyvalent reducible metal, producing in solution a polyvalent fluoride salt of said metal, reducing the said metal in solution to a lower valency, and recovering a useful fluorine compound from the solution.

2. Process of decomposing calcium fluoride with a solution of a reducible metal in the trivalent state, producing in solution a fluorine compound thereof, reducing the said metal to the bivalent state and recovering a useful fluorine compound from the solution.

3. Process of decomposing calcium fluoride with a solution of a salt of a polyvalent reducible metal, reducing said metal to a lower valency in solution thus rendering the dissolved fluorine more loosely combined, and recovering fluorine from the solution as a solid compound.

4. Process of decomposing calcium fluoride with a solution of a ferric salt, producing in solution a soluble compound of fluorine and iron, reducing ferric to ferrous iron and recovering the fluorine from the solution as a solid compound.

5. Process of decomposing calcium fluoride with a solution of a ferric salt, producing in solution a soluble compound of iron and fluorine, reducing ferric to ferrous salt, and recovering the fluorine from the solution as a solid fluoride.

6. Process of decomposing calcium fluoride with a solution of a ferric salt, producing in solution a soluble compound of iron and fluorine, reducing ferric to ferrous salt, and precipitating the fluorine as a solid, relatively insoluble, double fluoride.

7. Process of decomposing calcium fluoride with a solution containing aluminum and ferric salt, producing in solution a compound of fluorine, reducing in solution ferric to ferrous salt, and removing aluminum and fluorine from the solution as an alkali-metal fluoaluminate.

8. Process of decomposing calcium fluoride with a solution containing ferric and aluminum sulphates, producing in solution a compound of fluorine, reducing ferric to ferrous salt, and removing fluorine and aluminum from the solution as sodium fluoaluminate.

9. Process of decomposing calcium fluoride with a solution of ferric and aluminum sulphates, producing in solution a compound of fluorine, reducing ferric to ferrous salt, thereby liberating the fluorine combined with the iron for reaction with the aluminum in presence of a sodium salt, supplying deficiency of fluorine by a soluble fluoride, and removing aluminum and fluorine from the solution as sodium fluoaluminate.

10. Process of producing alkali-metal fluoaluminate by reacting in solution on a fluoride double salt of aluminum, with an alkali-metal salt and ferrous fluoride.

11. Process of producing alkali-metal fluoaluminate by reacting in solution on a fluoride double salt of aluminum, with an alkali-metal salt and a soluble fluoride, reacting equivalently to hydrofluoric acid.

12. Process of producing alkali-metal fluoaluminate by reacting in solution on a double fluoride salt of aluminum, with an alkali-metal salt and hydrofluoric acid.

13. Process of producing sodium fluoaluminate by reacting in solution on a double fluoride salt of aluminum, and on a sodium salt and a reactive fluoride.

14. Process of producing sodium fluoaluminate by reacting in solution on a double fluoride-sulphate of aluminum, and on a sodium salt and a reactive fluoride.

15. Process of producing sodium fluoaluminate by reacting in solution between a double fluoride-sulphate of aluminum, sulphate of sodium and a reactive fluoride.

16. Process of producing sodium fluoaluminate by reacting in solution between a double fluoride-sulphate of aluminum, a sodium salt and hydrofluoric acid.

17. Process of producing sodium fluoaluminate which consists in reacting in solution between a soluble aluminum compound, and a sodium compound, with the reduction products of ferric double fluoride salt.

18. Process of treating and decomposing calcium fluoride with a solution containing aluminum salt and ferric salt, thereby producing a soluble fluorine-containing compound, and recovering iron and aluminum compounds from the solution as separate products.

19. Process of producing aluminum compound containing relatively little ferruginous material from a solution of mixed ferric and aluminum salts, which consists in treating the solution with calcium fluoride, thereby producing soluble fluorine-containing compound, recovering aluminum therefrom as a fluorine-containing compound separately from the iron present in the solution.

20. Process of producing a stable solution containing aluminum double fluoride salt and alkali metal salt from aluminous material containing alumina and alkali-metal compound, and recovering alkali-metal fluoaluminate from the solution by the action of a reactive fluoride.

21. Process of producing a stable solution containing aluminum double fluoride salt and potassium salt from aluminous material containing potash, and recovering potassium fluoaluminate from the solution by the action of a reactive fluoride.

22. Process of producing a stable solution containing aluminum double fluoride and potassium salt from aluminous material containing potash, adding a suitable reactive fluoride to the solution, thereby producing potassium fluoaluminate, and converting the potassium fluoaluminate to useful compounds of aluminum and potassium.

23. Process of producing a stable solution containing aluminum double fluoride and potassium salt from aluminous material containing potash, and recovering useful compounds of potassium and aluminum from the solution.

In testimony whereof I hereto affix my signature.

ANSON G. BETTS.